(12) United States Patent
Mudrick et al.

(10) Patent No.: US 9,754,517 B1
(45) Date of Patent: Sep. 5, 2017

(54) METHODS AND APPARATUS FOR SOLAR POWERED OSCILLATING DESIGN DISPLAY

(71) Applicants: David Mudrick, Prescott, AZ (US); Sheldon Morick, Calabasas, CA (US)

(72) Inventors: David Mudrick, Prescott, AZ (US); Sheldon Morick, Calabasas, CA (US)

(73) Assignee: David Mudrick, Prescott, AZ (US)

( * ) Notice: Subject to any disclaimer, the term of this patent is extended or adjusted under 35 U.S.C. 154(b) by 0 days.

(21) Appl. No.: 15/332,647

(22) Filed: Oct. 24, 2016

(51) Int. Cl.
| | |
|---|---|
| *A47F 11/06* | (2006.01) |
| *G09F 7/22* | (2006.01) |
| *H02S 40/30* | (2014.01) |
| *G09F 7/18* | (2006.01) |

(52) U.S. Cl.
CPC ............... *G09F 7/22* (2013.01); *H02S 40/30* (2014.12); *G09F 2007/1852* (2013.01); *G09F 2007/1856* (2013.01)

(58) Field of Classification Search
CPC ...................................................... A63H 29/22
USPC ............................................................ 40/427
See application file for complete search history.

(56) References Cited

U.S. PATENT DOCUMENTS

| | | | | |
|---|---|---|---|---|
| 3,424,960 A | * | 1/1969 | Ross ................... | G04C 3/0278 310/39 |
| 4,250,659 A | * | 2/1981 | Ishiguro ................. | A63H 13/12 273/456 |
| 4,728,871 A | * | 3/1988 | Andrews ................. | G09F 19/02 318/130 |
| 5,881,679 A | * | 3/1999 | Hann .................... | A01K 15/025 119/707 |
| 2015/0182868 A1 | * | 7/2015 | Wu ........................... | A47G 7/08 446/484 |

* cited by examiner

*Primary Examiner* — Joanne Silbermann
(74) *Attorney, Agent, or Firm* — David S. Kerr; Berg Hill Greenleaf Ruscitti LLP

(57) ABSTRACT

An oscillating design display is described. Such a design may include virtually any personalized design a customer may desire. By generation of a magnetic field from an induction coil, such a displayed design may be made to oscillate between two endpoints in a single plane of motion. Such an induction coil may be powered by solar energy.

15 Claims, 3 Drawing Sheets

METHODS AND APPARATUS FOR SOLAR POWERED OSCILLATING DESIGN DISPLAY

TECHNICAL FIELD

Generally, the inventive technology disclosed herein relates to techniques, systems, methods and apparatus for providing an oscillating design display, which design may further be personalized, coupled with a solar power source.

BACKGROUND

Traditional design displays are known and typically purchased as an immobile item, such as for example a snow globe, keychain, name tag, lithograph, image, or the like. However, such traditional systems typically lack any personalization, or value-added aspects beyond what is displayed on the design itself. As discussed below, the current invention describes generally an oscillating design display system that may be personalized not only to a specific individual, but may be virtually anything of a functional weight and size. In addition, such personalized designs (1) may include value-added features such as the incorporation of movement, perhaps oscillatory movement, for aesthetic enjoyment and a system of solar power to drive such movement. The foregoing problems regarding conventional design display systems and processes may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

DETAILED DESCRIPTION OF INVENTION

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
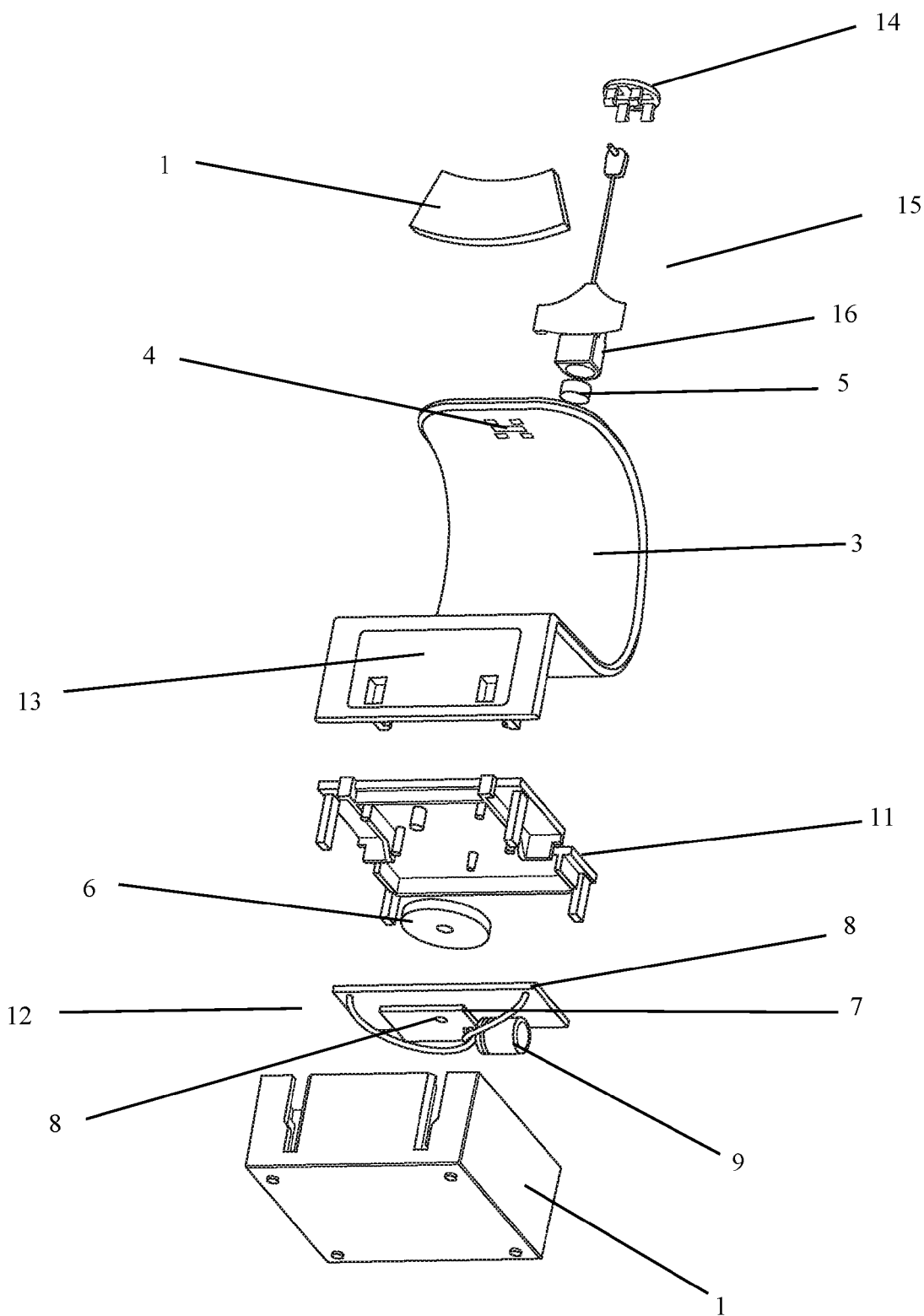
FIG. 1 is a perspective view of disassembled components of an embodiment of the invention.
Figure 2:
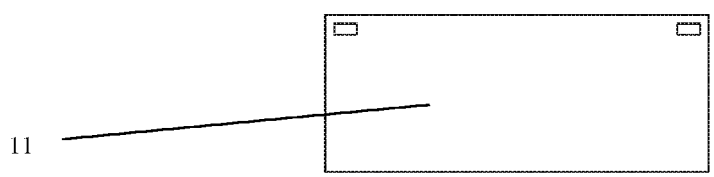
FIG. 2 is a front view of a component of an embodiment of the invention.
Figure 3A:
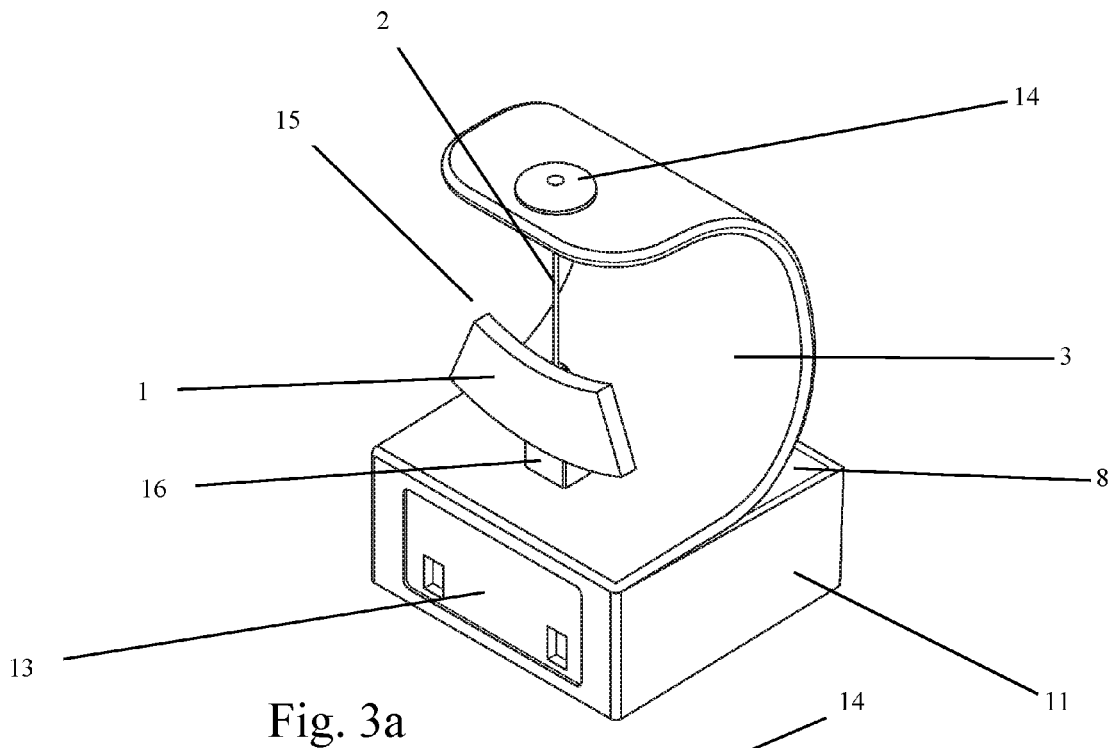
FIG. 3a is a perspective view of an assembled embodiment of the invention.
Figure 3B:
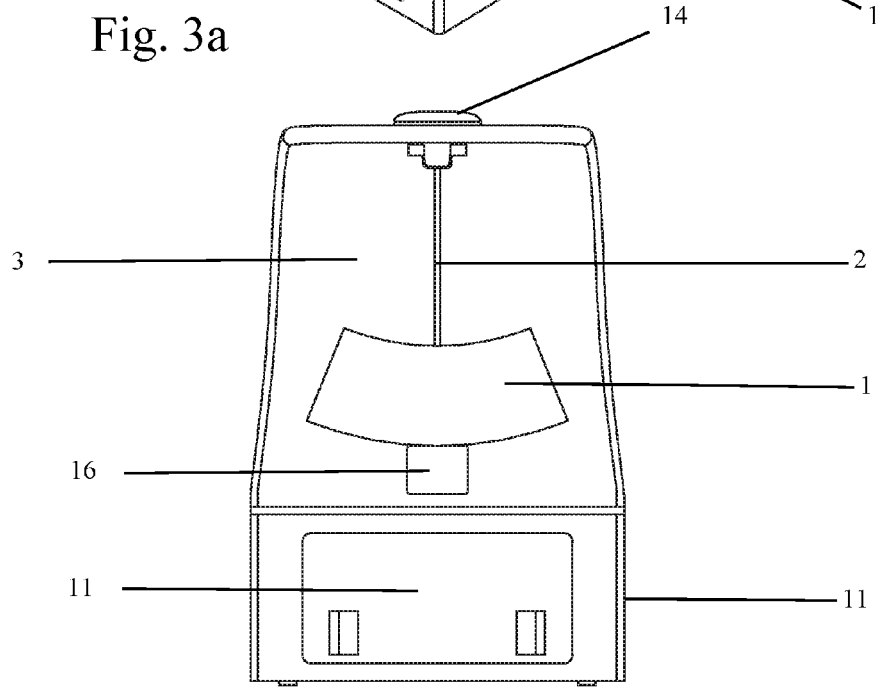
FIG. 3b is a front view of an assembled embodiment of the invention.

As generally described in FIGS. 1-3, certain embodiments of the inventive technology may include a personalized design (1). In various embodiments, such designs can be virtually anything a user may wish to display. As examples, embodiments may display a design including a name plate, a photographic image, a drawn image, a lithograph, a lenticular image, a sculpture, lettering, a symbol, or a personalized design (1) of any sort configured to the appropriate weight and dimensions.

As noted above, one aspect of the invention is the ability to move the displayed design (1). In certain embodiments, such movement may be oscillation, perhaps between two particular endpoints. In certain embodiments, such oscillation may be isolated to a single plane of motion. In certain embodiments, this isolation may be accomplished by mounting a swinger (2) into particular grooves (4) in a hanger unit (3), thereby physically restricting the swinger's motion to the aforementioned single plane.

In other embodiments, the movement may be driven by solar power. In certain embodiments, a magnet (5) may be attached to a swinger (2), which in turn may be mounted onto a hanger unit (3). A design of any sort may be coupled with the magnet (5). Below the magnet (5), in certain embodiments, an induction coil (6) may be established. This induction coil (6) may be wired to a circuit board (7) and powered by a solar panel (8). When such a device is powered, the induction coil (6) may generate a magnetic field, and this field may exert a repulsive force on the above-mentioned hanging magnet (5). With the proper (variable) weight, the repulsive force may be tailored so that it repels the magnet (5) (and, by extension, the displayed design), causing motion to a first terminus. Upon reaching that first terminus, the weight of the magnet/design assembly may be sufficient to overcome the repulsive force and fall back to and past a resting position, whereupon the repulsive force may then move the magnet (5) to a second terminus. The process may then repeat itself to produce motion, perhaps oscillating motion, until the power to the induction coil (6) is removed.

In certain embodiments, a solar panel (8), circuit board (7), capacitor (9), integrated chip (10), and induction coil (6) may be conveniently assembled into a component box (11), as illustrated by FIG. 1. In addition to housing the above-mentioned components, such a component box (11) may be designed to couple with a hanger unit (3). This hanger unit (3) may be made of transparent plastic to allow a light source, perhaps sunlight, to pass through unfiltered to the aforementioned solar panel (8). In particular embodiments, as examples, the components may be sized as follows. A capacitor (9) may be sized at 6.4 mm×9 mm. A circuit board (7) may be sized at 17 mm×11 mm. An induction coil (6) may be sized at 13 mm in diameter and 2.35 mm in height. A solar panel (8) may be sized as a 30 mm square with 3.16 mm in height. A component box (11) may be sized at 33 mm×45 mm×13 mm when opened, or at 33 mm×33 mm×13 mm when closed. In certain embodiments, the component box (11) may be made of plastic, and in one embodiment, such aforementioned plastic may be black. Of course, the aforementioned dimensions are exemplary only, and the inventive technology may be scaled to function at both larger and smaller sizes.

In certain embodiments, a solar panel (8) may be installed such that it fits in the top of a component box (11) and is able to receive sunlight thereby. In certain embodiments, a circuit board (7) may be mounted under that solar panel (8) inside a component box (11). An induction coil (6) may then be wired into that circuit board (7) so that it may receive power from the aforementioned solar panel (8). The induction coil's wires may be long enough to allow for the induction coil (6) to be mounted proximally to the solar panel (8), opposite the aforementioned circuit board (7), as shown in FIG. 1. In certain embodiments, a transparent plastic hanger unit (3) may then be mounted to the assembly. In some embodiments, this hanger unit (3) may have a space integral to its bottom designed to receive the aforementioned induction coil (6) when such a hanger unit (3) is mounted to the rest of the apparatus. This integral space may allow for an induction coil (6) to be housed beneath the lip of a base, thereby concealing such an induction coil (6) from view.

In certain embodiments, a hanger unit (3) may be mounted to a solar-powered induction coil assembly (12), as described above and shown in FIG. 1. In some embodiments, this hanger unit (3) may be open on three sides and curve backward from the intended angle of view. In some embodiments, this hanger unit (3) may be sized at 64 mm tall and 35 mm wide at its base, so that it may completely cover a component box (11) like the one discussed above. In certain embodiments, such a hanger unit (3) may, in a portion covering a front of a component box (11), have a molded inset (13) within which a decorative item may be established. In certain embodiments, this item may be a sticker; in further embodiments, it may be a solar zipper pull sticker; and in still further embodiments, such a decorative item may be personalized, perhaps to customer or user specifications. In some embodiments, an inset for such a sticker may be molded into a hanger unit (3) and may have dimensions of 1.162 in×0.532 in. Such a hanger unit (3) may narrow as it curves upward. A portion of this hanger unit (3) may therefore be established directly above and opposite the bottom portion, which may house an induction coil (6) as discussed above. In certain embodiments, this top portion of a hanger unit (3) may be configured to receive a top portion of a swinger (2). In one embodiment, this configuration may take the form of grooves (4) in the plastic. Whether in the form of grooves (4) or an alternative configuration, in certain embodiments, this mounting point in a top portion of a hanger unit (3) may also be configured to receive a cover button (14). In some embodiments, this cover button (14) may snap in to provide a smooth surface on the top side of the hanger unit (3). A cover button (14) may also serve, in certain embodiments, to secure a swinger (2) to a hanger unit (3). In one embodiment, such a cover button (14) may be sized at 10.6 mm in diameter. In certain embodiments, this cover button (14) may be made of translucent plastic, and in one embodiment, such a cover button (14) may be milky white in color. These are examples only; a cover button (14) may indeed be any color or a variety of materials without departing from the scope of the inventive technology.

As discussed above, embodiments of the inventive technology may contain a swinger assembly (15) mounted to a hanger unit (3) above an induction coil (6), as shown in FIG. 1. Such a swinger assembly (15) may be made of a flexible material that may bend, and may terminate in attachment to a mounting unit (16), such as a connector, perhaps a plastic connector. In some embodiments, this connector may then have a magnet (5) coupled to it. In some embodiments, this flexible material may be a wire, perhaps music wire. In one particular embodiment, this flexible material may be 0.25 music wire. In some embodiments, a swinger assembly (15) may also include an axis to control direction of motion.

As discussed above and shown in FIG. 1, embodiments of the inventive technology may include a magnet (5) as part of a swinger assembly (15). In certain embodiments, this magnet (5) may be coupled with a rear portion of a mounting unit (16). In some embodiments, this magnet (5) may be made of a ceramic material. In one particular embodiment, such a ceramic magnet (5) may have dimensions of 9.8 mm in diameter and 5 mm in height. In certain embodiments, the front portion of a mounting unit (16) like the one discussed above may be configured to allow the mounting of a design. Although the design itself may be personalized for a given user and could therefore encompass almost anything desired, certain possible embodiments do suggest themselves. In certain embodiments, such a design may comprise lettering mounted to craft foam, such as EVA foam. In other embodiments, a "design" as used herein may be broadly construed to include all specific possibilities mentioned above as well as anything else a user might desire.

Various configurations of the inventive technology are possible to assemble without departing from the essential inventive concepts described herein and claimed below. The following is but one example of a possible embodiment. In this embodiment, an oscillating design display may be assembled by following the steps described below and visually illustrated in FIG. 1. A circuit board (7) may be glued or otherwise adhered to the bottom of a solar panel assembly. Such a circuit board (7) may already have an integrated chip (10). In addition to such a chip, a capacitor (9) and wires running to an induction coil (6) may be soldered into or otherwise mounted to a circuit board (7). Importantly, such wires should be of sufficient length and flexibility to allow the solar panel (8) (with attached circuit board on the bottom) to be turned over and the induction coil (6) to which the wires run to be placed on top of such a solar panel assembly, opposite a circuit board (7). The resulting solar panel assembly may then be placed into a slot in a component box (11). If desired, for aesthetic or other reasons, a sticker of a desired color, perhaps black, may be placed over the induction coil (6) at this stage. The component box (11) may then be closed. At this point, a hanger unit (3) may be mounted to the component box (11), perhaps by clipping onto the sides. A swinger assembly with an attached design may then be mounted to the top of the aforementioned hanger unit (3). At this point, a cover button (14) may then be snapped in at the top of the hanger unit (3) to cover the mounting juncture for the swinger assembly (15). Finally, the entire oscillating design display may then be packaged for sale or otherwise used or disposed of.

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves apparatus, systems, methods, and techniques as well as devices to accomplish solar powered mobile design display and the like. In this application, the improved techniques, including novel and unique methods and apparatus for solar powered mobile design display and the like are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "display" should be understood to encompass disclosure of the act of "displaying"—whether explicitly discussed or not—and, conversely, were there effectively disclosure of the act of "displaying", such a disclosure should be understood to encompass disclosure of a "display method and/or technique, and or device" and even a "means for displaying". Such changes and alternative terms are to be understood to be explicitly included in the description.

In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated herein by reference in their entirety. Finally, all references listed in the list of References To Be Incorporated By Reference In Accordance With The Patent Application or other information statement filed with the application are hereby appended and hereby incorporated by reference herein in their entirety, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the methods, improvements and/or devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A moving design display comprising:
   a solar panel positioned under a transparent hanger unit wherein said hanger unit is configured to allow light to pass through to said solar panel and wherein said transparent hanger unit is further configured to partially obscure the position of said solar panel;
   an induction coil powered by said solar panel;
   a circuit board for routing an electrical current from said solar panel to said induction coil and configured to generate an electrical pulse of said electrical current to said induction coil;
   a mobile swinger coupled to said transparent hanger unit having a first terminus and a second terminus, said swinger configured to oscillate between said first terminus and said second terminus when light energy passes through said transparent hanger and activates said solar panel generating said electrical current which is routed to said induction coil through said circuit board and which generates a pulsed magnetic field and wherein said mobile swinger and said pulsed magnetic field are configured to oscillate said mobile swinger between said first terminus and said second terminus along a single-plane;
   a magnet mounted on said mobile swinger and configured to be positioned in relationship to said induction coil so as to oscillate between said first terminus and said second terminus along a single-plane in response to said pulsed magnetic field;
   a component box configured to house said circuit board, said solar panel, and said induction coil and support said hanger unit; and
   a light-weight personalized design mounted to said mobile swinger and configured in a balanced position in relation to said pulsed magnetic field from said induction coil to allow said mobile swinger to oscillate between said first terminus and said second terminus in a single-plane.

2. A moving design display as in claim 1, further comprising a cover button mounted to said hanger unit proximal to said mounted mobile swinger.

3. A moving design display as in claim 1, wherein said hanger unit comprises grooves configured to limit the oscillations of said mobile swinger to a single plane of movement.

4. A moving design display as in claim 1, wherein said swinger comprises a swinger assembly.

5. A moving design display as in claim 4, wherein said swinger assembly comprises a portion of music wire and at least one plastic connector.

6. A moving design display as in claim 1, wherein said magnet comprises a weighted magnet.

7. A moving design display as in claim 1, wherein said magnet comprises a magnet configured to utilize repulsive forces generated by the interaction of said induction coil with said magnet to produce a swing of precise distance along a single-plane.

8. A moving design display as in claim 1, wherein said personalized design comprises an EVA foam design.

9. A moving design display as in claim 1, wherein said personalized design comprises a personalized design selected from the group consisting of: a name display, a lenticular image, a photographic image, an image, a lithograph, and lettering.

10. A method of displaying designs comprising the steps of:
- receiving solar energy into a solar panel positioned proximally to a transparent hanger unit wherein said hanger unit is configured to allow light to pass through to said solar panel and wherein said transparent hanger unit is further configured to partially obscure the position of said solar panel;
- converting said solar energy into an electrical current;
- routing said electrical current through a circuit board and into an induction coil wherein said circuit board is configured to route said electrical current to said induction coil in a pulse which further generates a pulsed magnetic field from said induction coil;
- generating a pulsed magnetic field from said induction coil;
- generating pulsed repulsive force with said magnetic field;
- swinging a magnet coupled with a mobile swinger in a single-plane with said repulsive force;
- mounting a light-weight personalized design to said mobile swinger wherein said light-weight personalized design mounted in a balanced position in relation to said pulsed magnetic field from said induction coil to allow said mobile swinger to oscillate between a first terminus and a second terminus in a single-plane; and
- displaying said light-weight personalized design.

11. A method of displaying designs as in claim 10, further comprising the step of overcoming magnetic resistance via gravity accelerating a weighted magnet.

12. A method of displaying designs as in claim 10, wherein said of step routing said electrical current through a circuit board and into an induction coil comprises the step of routing said electrical current into an induction coil mounted on said solar panel opposite said circuit board.

13. A method of displaying designs as in claim 10, further comprising the step of transparently packaging a completed display unit such that light energy can reach said solar panel when encased in said packaging.

14. A method of displaying designs as in claim 10, wherein said step of mounting a light-weight personalized design to said mobile swinger comprises the step of mounting a design selected from the group consisting of: a name display, a lenticular image, a photographic image, an image, a lithograph, and lettering.

15. An oscillating display comprising:
- a solar panel positioned under a transparent hanger unit wherein said hanger unit is configured to allow light to pass through to said solar panel and wherein said transparent hanger unit is further configured to partially obscure the position of said solar panel;
- an induction coil powered by said solar panel;
- a circuit board for routing an electrical current from said solar panel to said induction coil and configured to generate an electrical pulse of said electrical current to said induction coil;
- a mobile swinger coupled to said transparent hanger unit having a first terminus and a second terminus, said swinger configured to oscillate between said first terminus and said second terminus when light energy passes through said transparent hanger and activates said solar panel generating said electrical current which is routed to said induction coil through said circuit board and which generates a pulsed magnetic field and wherein said mobile swinger and said pulsed magnetic field are configured to oscillate said mobile swinger between said first terminus and said second terminus along a single-plane;
- a magnet mounted on said mobile swinger and configured to be positioned in relationship to said induction coil so as to oscillate between said first terminus and said second terminus along a single-plane in response to said pulsed magnetic field; and
- a component box configured to house said circuit board, said solar panel, and said induction coil and support said hanger unit.

* * * * *